(12) United States Patent
Zeng

(10) Patent No.: US 7,069,156 B2
(45) Date of Patent: Jun. 27, 2006

(54) METHOD FOR ADJUSTING THE PITCH AND ROLL STATIC TORQUES IN A DISK DRIVE HEAD SUSPENSION ASSEMBLY

(75) Inventor: Qinghua Zeng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 330 days.

(21) Appl. No.: 10/763,582

(22) Filed: Jan. 23, 2004

(65) Prior Publication Data

US 2005/0165561 A1    Jul. 28, 2005

(51) Int. Cl.
*G01L 1/00*    (2006.01)
(52) U.S. Cl. .................. 702/43; 72/16.2; 72/16.3; 72/21.4; 702/41; 702/42; 702/85; 702/94; 702/95
(58) Field of Classification Search ............ 702/43, 702/41, 42, 85, 94, 95, 150–154; 29/603.04, 29/603.06; 360/245.5, 245.1; 72/16.2, 16.3, 72/21.4; 217/121.6, 121.85
See application file for complete search history.

(56) References Cited

U.S. PATENT DOCUMENTS

| | | | |
|---|---|---|---|
| 5,473,488 A * | 12/1995 | Gustafson et al. ....... 360/245.5 |
| 6,011,239 A | 1/2000 | Singh et al. |
| 6,466,257 B1 | 10/2002 | Baugh et al. |
| 2002/0171970 A1* | 11/2002 | Girard et al. ............ 360/77.03 |

* cited by examiner

Primary Examiner—Carol S. W. Tsai
Assistant Examiner—Stephen J. Cherry
(74) Attorney, Agent, or Firm—Thomas R. Berthold

(57) ABSTRACT

A method for adjusting the pitch and roll static torques (PST and RST) on a slider in a disk drive head-suspension assembly (HSA) during manufacturing assures that each HSA is manufactured with acceptable PST and RST values. The method includes measuring each slider's pitch and roll static attitudes (PSA and RSA) and determining each HSA's pitch and roll torsional stiffnesses. These values are then used to calculate the required amount of adjustment to PSA and RSA to achieve the desired values of PST and RST for each HSA. The suspension is then adjusted, such as by heating the flexure with a laser.

29 Claims, 4 Drawing Sheets

METHOD FOR ADJUSTING THE PITCH AND ROLL STATIC TORQUES IN A DISK DRIVE HEAD SUSPENSION ASSEMBLY

TECHNICAL FIELD

This invention relates generally to magnetic recording disk drives and more particularly to a method for adjusting the static torque applied to an air-bearing slider in a disk drive head-suspension assembly.

BACKGROUND OF THE INVENTION

Magnetic recording hard disk drives use a read/write transducer or head mounted on an air-bearing slider for reading and/or writing data to the disk. The slider is attached to an actuator arm by a suspension and positioned very close to the disk surface by the suspension. The combination of the slider and suspension is called the head-suspension assembly (HSA). There are typically a stack of disks in the disk drive with a HSA associated with each disk surface in the stack.

The separation between the slider and the disk surface is called the flying height. The slider rides on a cushion or bearing of air generated by the rotation of the disk. The slider is attached to a flexure on the suspension and the suspension includes a load beam that applies a load force to the slider to counteract the air-bearing force while permitting the slider to "pitch" and "roll". The flying height and flying dynamics of the slider are influenced by factors such as the rotation speed of the disk, the aerodynamic shape of the air-bearing surface (ABS) of the slider, the load force applied to the slider by the suspension, and the pitch and roll torques applied to the slider by the suspension.

The desired pitch and roll torques are determined from the pitch static attitude (PSA) and roll static attitude (RSA) and the pitch and roll stiffnesses ($K_p$, $K_r$) of the suspension. These torques are called the pitch static torque (PST) and roll static torque (RST). Thus, PST=$K_p$PSA; and RST=$K_r$RSA.

The slider pitch and roll dynamic or flying attitudes are determined by a force balance between the air-bearing force and the suspension load force and static torques (PST and RST). The deviations of the dynamic attitudes should be very small to achieve good performance and high reliability. The slider dynamic attitudes are very sensitive to PST and RST, especially in disk drives that use very small sliders or very-low-flying sliders, or disk drives with a relatively low rotational speed, such as the commercially available 1-inch disk drives. Therefore, it is important to reduce deviations in PST and RST and assure that all HSAs are manufactured with essentially the same PST and RST values.

In conventional HSA manufacturing, $K_p$ and $K_r$ are assumed to be constants that do not vary from one HSA to the next. Then, the deviations of PST and RST (dPST and dRST) can be expressed as:

dPST=$K_p$dPSA; and dRST=$K_r$dRSA, where dPSA and dRSA are the deviations in PSA and RSA, respectively.

Therefore, to reduce dPST and dRST, dPSA and dRSA are reduced by adjusting PSA and RSA. For example, some disk drive manufacturers mechanically adjust the PSA and RSA by bending a suspension component, such as the flexure. U.S. Pat. No. 6,011,239 describes a method for adjusting the PSA and RSA to the desired values by first measuring the PSA and RSA and then laser heating the flexure.

Typically, the standard deviation of $K_p$ and $K_r$ is in the range of about 5% to 10%. However, it has recently been determined that the standard deviation of $K_p$ and $K_r$ can be as large as 23%. When there are relatively large non-zero PSA and RSA values (such as a PSA of 2.0 degrees), $K_p$ and $K_r$ deviations can also result in large dPST and dRST deviations even though dPSA and dRSA are zero. In reality the effect can be worse because adjustment of PSA and RSA can also change $K_p$ and $K_r$.

Thus, what is needed is an HSA manufacturing process that adjusts PST and RST and assures that all HSAs have substantially the same values of PST and RST, regardless of deviations in $K_p$ and $K_r$ and PSA and RSA.

SUMMARY OF THE INVENTION

The invention is method for adjusting the pitch and roll static torques (PST and RST) on a slider in a disk drive head-suspension assembly (HSA) during manufacturing to assure that each HSA is manufactured with acceptable PST and RST values. The method includes measuring each slider's pitch and roll static attitudes (PSA and RSA) and determining the pitch and roll torsional stiffnesses for each HSA. These values are then used to calculate the required amount of adjustment to PSA and RSA to achieve the desired values of PST and RST for each slider. The suspension is then adjusted, such as by heating the flexure with a laser.

The pitch and roll torsional stiffnesses of each HSA are determined from the slider's pitch and roll natural frequencies and effective moments-of-inertia. The moments-of-inertia are substantially the same for each slider and may be calculated or measured from a sample of HSAs. In the measurement method, each of a sample of HSAs is vibrated and the response is measured with a laser Doppler vibrometer to arrive at pitch and roll natural frequencies. Each of the samples is then subjected to known torques and the angular deflections measured to arrive at measured torsional stiffnesses. The resulting measured frequencies and torsional stiffnesses are used to calculate the moments-of-inertia for each sample, and an averaging or other statistical technique is used to arrive at fixed values for slider pitch and roll moments-of-inertia that are used in the method to adjust PST and RST for each HSA during manufacturing.

During manufacturing each slider's pitch and roll natural frequencies are measured using a laser Doppler vibrometer. These measured values are then used with the fixed values of slider pitch and roll moments-of-inertia determined from the prior HSA samples to determine the pitch and roll torsional stiffnesses for each slider.

Thus each slider's pitch and roll torsional stiffnesses are measured during manufacturing. This avoids the problem of relying only on a measurement of PSA and RSA to assume that the PST and RST values are acceptable. Each slider is now manufactured to the desired values of PST and RST. This method thus assures that all sliders will have substantially the same values of PST and RST.

For a fuller understanding of the nature and advantages of the present invention, reference should be made to the following detailed description taken together with the accompanying figures.

DETAILED DESCRIPTION OF THE INVENTION

Figure 1:
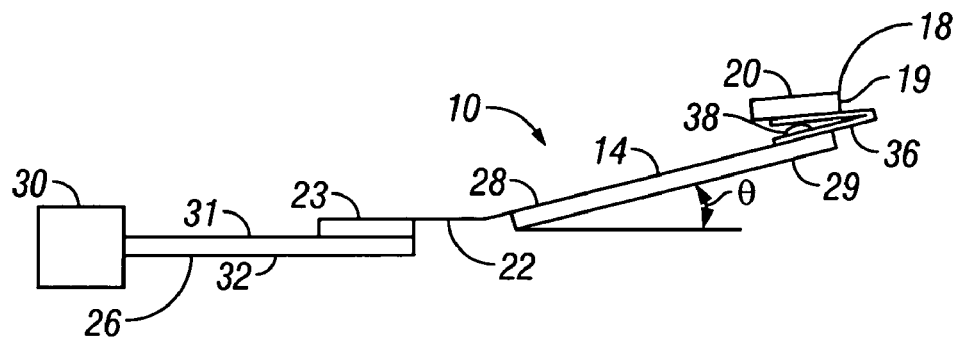
FIG. 1 is a side view of a head-suspension assembly in the unloaded state.

FIG. 1 illustrates a head-suspension assembly (HSA) 10 comprised of a load beam 14 an air-bearing slider 18, and a gimbal or flexure 36 connecting the slider 18 to the load beam 14. The slider 18 includes a trailing surface 19, where the read/write head is located, and an air bearing surface (ABS) 20. The load beam 14 includes a hinge region 22 which is connected by a connector 23 to an actuator arm 26. The load beam 14 is bent at an angle Θ relative to the hinge region 22. The load beam 14 has a top side 28 and a bottom side 29. The top side 28 is the side of the load beam 14 on which the slider 18 is mounted, and the bottom side 29 is the side of the load beam 14 opposite to the top side 28.

Figure 2:
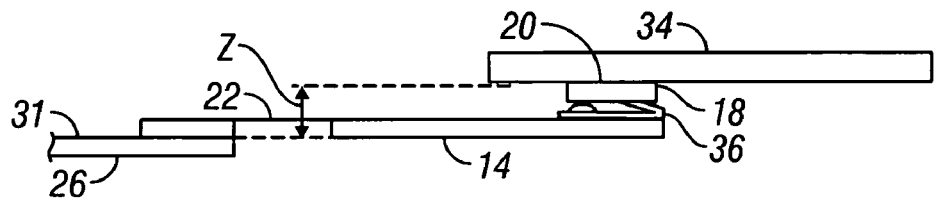
FIG. 2 is a side view of a head-suspension assembly with the slider in the loaded state on the disk.

The actuator arm 26 is connected to an actuator 30 which functions to move the slider 18 relative to the surface of a rigid magnetic recording disk 34 (shown in FIG. 2). The actuator arm 26 has a top surface 31 that faces in the same direction as the top side 28, and a bottom surface 32 that faces in the same direction as the bottom side 29. The load beam 14 is attached to the actuator arm 26 along the surface 31 by the connector (base plate) 23. The slider 18 is attached to the load beam 14 by a flexure 36 and a dimple 38. The flexure 36 is a flexible member that allows the slider 18 to pivot on the dimple about the pitch axis (the transverse or Y axis) and the roll axis (the longitudinal or X axis). The load beam 14 imposes a counteracting load force to the slider 18 at the dimple 38 to balance the air bearing force from the rotating disk 34. As is well known in the art, a second HSA is typically attached to the bottom surface 32 of the actuator arm 26. The second HSA is identical to HSA 10 but faces in the opposite direction so that its slider can engage with a second disk in the disk stack.

FIG. 2 illustrates the relationship of the HSA 10 to the disk 34 when the disk 34 is not rotating. In the configuration shown in FIG. 2, the HSA 10 is said to be in the "loaded" state. In the loaded state, the load beam 14 and the flexure 36 are bent down by the disk 34 so that the angle Θ between the load beam 14 and the hinge region 22 is close to zero. Because the hinge region 22 resists this deformation, a load force (also called the gram load) is transmitted through the load beam 14 and dimple 38 to the slider 18. The distance between the ABS 20 of the slider 18 and the top surface 31 of the arm 26 is called the "z" height. In cases where the slider 18 is not present, the distance between the surface 31 and the top of the flexure 36 is called the z height.

Figure 3:
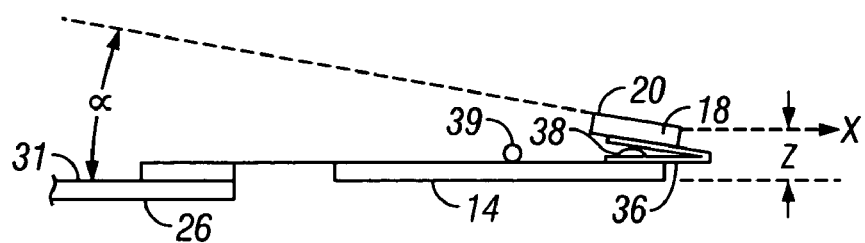
FIG. 3 is a side view of a head-suspension assembly according.
Figure 4:
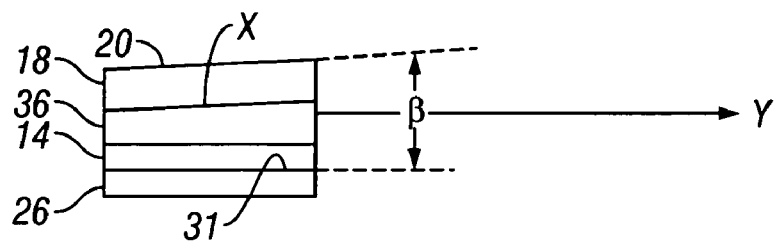
FIG. 4 is an end view of the head-suspension assembly shown in FIG. 3 showing the roll static attitude of the slider.

FIG. 3 illustrates the load beam 14 held in the loaded state by an external means such as a pin 39. In this configuration, an angle α is defined by the ABS 20 and the top surface 31. The angle α is referred to as the pitch static attitude (PSA) of the slider 18. Also in this configuration, an angle β is defined by the horizontal tilt of the ABS 20 relative to the top surface 31, as illustrated in FIG. 4. FIG. 4 is an end view of the HSA 10 with the load beam 14 held in the loaded state as was described in FIG. 3. The angle β is referred to as the roll static attitude (RSA) of the slider 18. The term "static attitude" is used to describe both PSA and RSA together, with the PSA and RSA being separate components of the static attitude.

Figure 5:
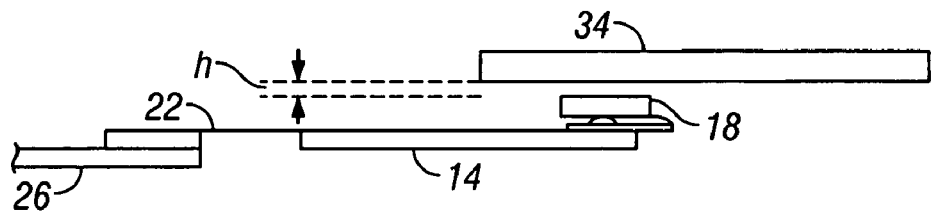
FIG. 5 is a side view of a head-suspension assembly illustrating the flying height of the slider.

FIG. 5 illustrates the relationship of the HSA 10 to the disk 34 when the disk 34 is rotating. The rotation of the disk 34 causes the slider 18 to be positioned a distance "h" from the surface of the disk 34. The distance "h" between the ABS 20 and the disk 34 is referred to as the slider "flying height" and represents the position of the slider 18 when the disk 34 is rotating during normal operation of the disk drive. If the flying height is not maintained within a certain range, the quality of the data read from or written to the disk 34 degrades.

Several factors contribute to the flying height. When the disk 34 is rotating, the rotation of the disk 34 creates a force (called an air bearing) that pushes the slider 18 away from the disk 34. The load transmitted to the slider 18 by the load beam 14 and the pitch and roll torques exerted by the flexure 36 on the slider 18 oppose the air-bearing force. Therefore, adjustments to the angles Θ, α (PSA), and β (RSA) contribute to the final value of the flying height "h." Typically, the angle Θ is set at some predetermined value during the manufacturing process and provides the coarse positioning of the slider 18 which allows the flying height to be maintained when the disk 34 is rotating. The PSA and RSA are also set at some predetermined values during manufacturing. However, as described previously merely adjusting PSA and RSA does not assure that dPST and dRST are small.

Figure 6:
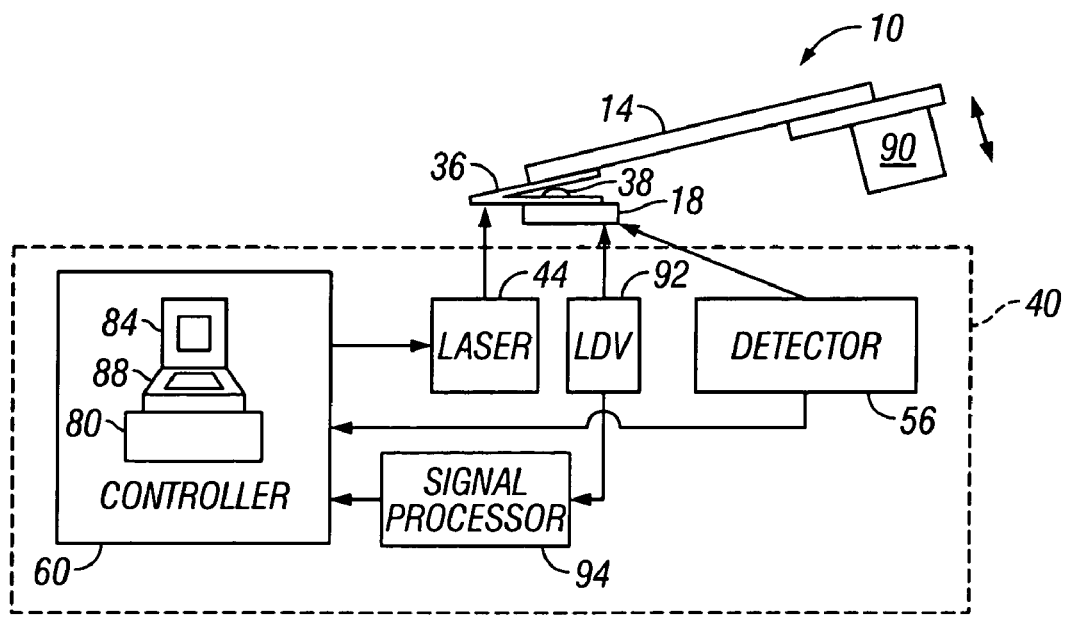
FIG. 6 is a schematic diagram of an apparatus for performing the static torque adjustment method according to the present invention.

FIG. 6 illustrates the HSA adjustment apparatus 40 for adjusting the PST or RST in the HSA 10 to predetermined values in accordance with the present invention. The apparatus 40 includes a pulsed laser 44, a detector 56, a slider excitation or vibration source 90, a laser Doppler vibrometer (LDV) 92, a signal processor 94, and a controller 60. The pulsed laser 44 delivers high energy radiation in short pulses to heat the flexure 38 at appropriate locations to change the PSA and RSA. The pulsed laser 44, detector 56 and controller 60 together function as described in more detail in the previously cited '239 patent.

The detector 56 measures the PSA and RSA. As is well known in the art, detectors of this type comprise a single wavelength laser (e.g., a helium-neon laser) which is positioned to illuminate the slider 18 or the flexure 36, and project a pattern of reflected light onto a detector, such as a chart, a diode array or a charge-coupled device. The pattern of reflected light is then compared to a standard pattern to yield the RSA or PSA. Generally, whenever PSA or RSA are being measured the slider 18 is held in place at the flying height (z distance) by an external means, such as the pin 39 shown in FIG. 3.

The controller 60 processes information from the detector 56 and the LDV 92 and controls the laser 44. In the preferred embodiment the controller 60 comprises a desktop computer having a keyboard 80 for entering commands, a monitor 84 for displaying system information, and a computer 88 which includes a microprocessor-controlled motherboard, a hard disk drive and a floppy disk drive. The controller 60 also includes software running on the computer 88 for performing the calculations described below, including processing the output data from the detector 56 and LDV 92 and calculating the quantity of radiation from the laser 44 required to adjust the PSA or RSA by a desired amount.

The vibration source 90 can be a shaker, such as a PZT device, or an electromagnetic shaker, attached to the fixture supporting the HSA 10. Alternatively, the vibration source 90 can be a stream of air directed at the slider from a source of pressurized air (not shown in FIG. 6). The LDV 92 measures the vibration response of the slider 18 and provides a velocity signal to a signal processor 94. The LDV 92 may be a commercially available device, such as a single-beam Polytec Model 501. The signal processor 94 can be a Hewlett-Packard Analyzer Model 3562A or similar device. The signal processor 94 decodes the velocity signal from the LDV 92 to a frequency response of the vibrating slider 18 and provides the measured natural frequency to the controller 60. While a LDV is depicted in FIG. 6, other noncontact devices for measuring the vibration response and thus the natural frequencies may be used, such as a capacitance probe.

Figure 7:
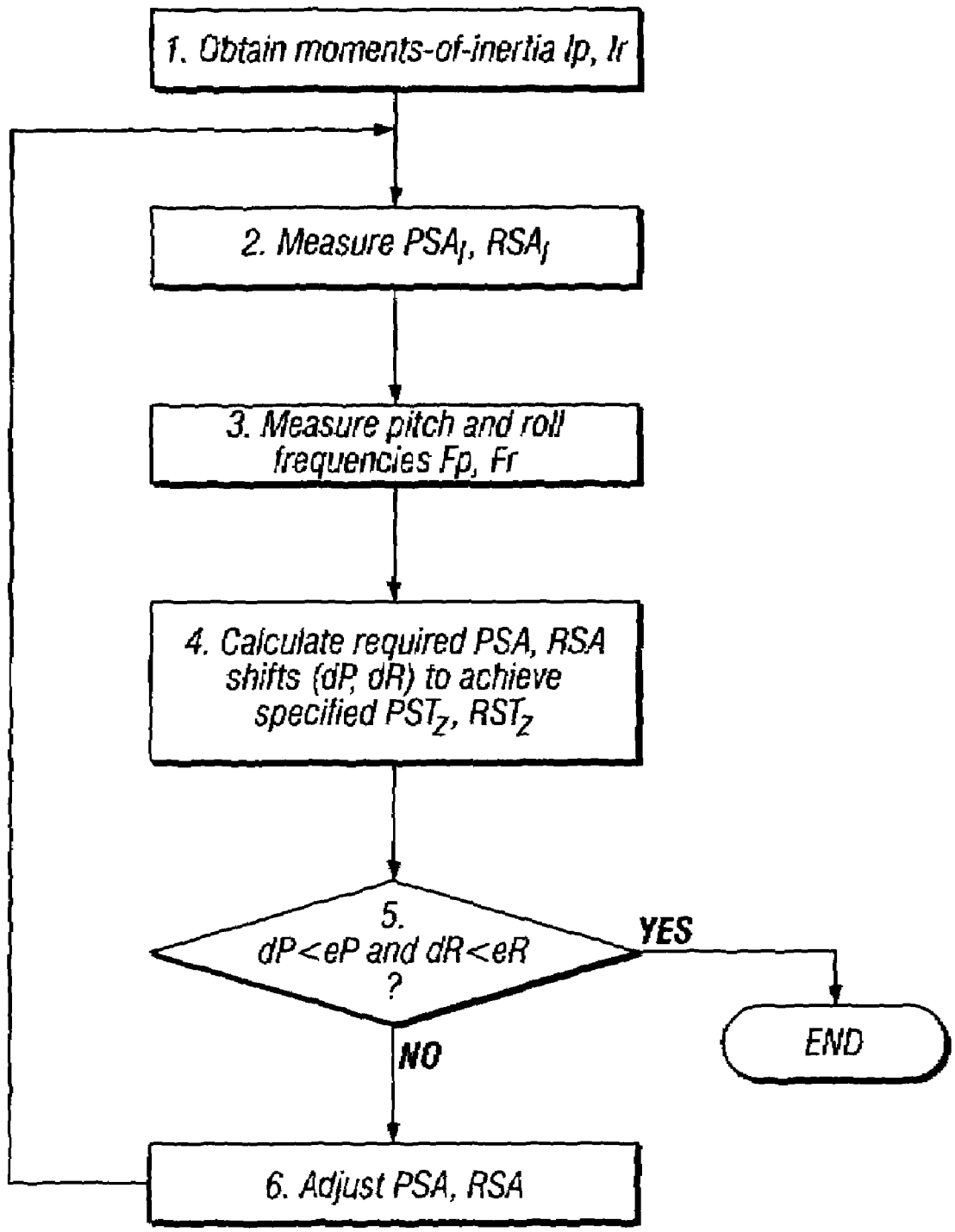
FIG. 7 is a flow chart for the static torque adjustment method according to the present invention.

The process to adjust the PST and RST to predetermined desired values according to the present invention is shown in the flowchart of FIG. 7. The process is shown as steps, but it is understood that the steps do not need to be performed in the order shown.

Step 1: Obtain Moments-Of-Inertia $I_p$ and $I_r$.

$I_p$ and $I_r$ are the effective slider pitch and roll moments-of-inertia, respectively, about the pitch and roll axes, respectively. The moments-of-inertia can be determined by calculation, measurement or a combination of calculation and measurement.

A) Calculation method: A finite element model of the HSA is built using conventional software, and based on the known dimensions and materials used in the HSA components, the moments-of-inertia are calculated.

B) Measurement method: A sample of HSAs are used to determine the natural frequencies $F_p$ and $F_r$ and torsional stiffnesses $K_p$ and $K_r$ of each of the samples. The natural frequencies are determined by exciting the sliders and measuring the natural frequencies with a LDV and signal processor. The torsional stiffnesses are measured by a standard static method, i.e., applying a known torque and measuring the angular deflection of each of the samples. The moments-of-inertia are then as follows:

$I_p = K_p/(4\pi^2 F_p^2)$; and
$I_r = K_r/(4\pi^2 F_r^2)$.

The results from the samples can be averaged or other statistical techniques used to arrive at values of $I_p$ and $I_r$.

C) Combination of calculation and measurement: Instead of measuring both the torsional stiffnesses and the natural frequencies of the sample HSAs, one or the other can be calculated from a finite element model, using commercially available software that calculates the dynamics of structural systems.

The effective $I_p$ and $I_r$ are usually larger than the $I_p$ and $I_r$ that are directly calculated by using slider dimensions and density, especially for a small slider. Deviations of $I_p$ and $I_r$ are typically small for same group of parts, so it is preferred to use the same values of $I_p$ and $I_r$ for the same group of HSAs. However, for a larger slider and/or for higher accuracy, it is preferred to measure the slider's X and Y alignment relative to the dimple and slider dimensions to make a correction to $I_p$ and $I_r$ for each HSA.

Step 2: Measure PSA and RSA

The initial pitch and roll static attitudes ($PSA_i$ and $RSA_i$, respectively) of the HSA being adjusted are measured using any known prior art technique, such as described in the previously cited '239 patent.

Step 3: Measure pitch and roll frequencies, $F_p$ and $F_r$

The HSA is held in a fixture at its end that attaches to the actuator, with the slider in its free state. An excitation is applied to the slider to cause it to vibrate. The excitation can be applied to the fixture by a PZT or electromagnetic shaker. Alternatively, a continuous or pulse flow of air can be directed to the slider. In some disk drives that unload the slider off the disk and onto a ramp when the drive is not operating, the excitation can be applied at the drive level, such as by applying an excitation from the actuator, or by rotating the disk to generate an air flow to excite the slider.

Figure 8:
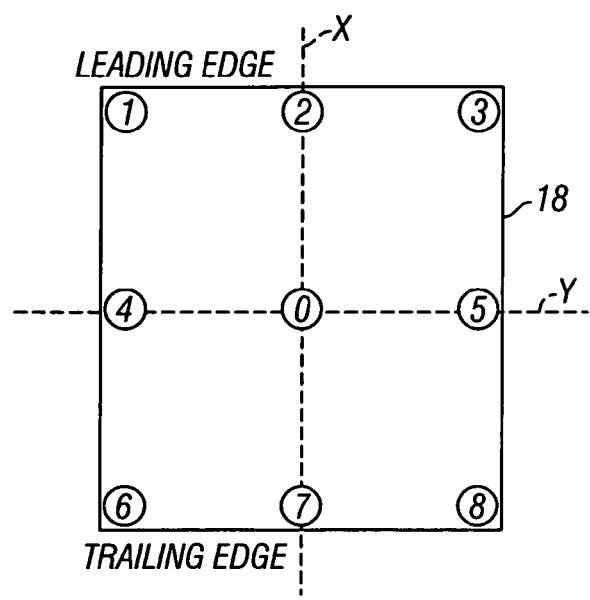
FIG. 8 is a view of the air-bearing surface (ABS) of a slider showing locations where the laser spot of the laser Doppler vibrometer (LDV) is aimed for the measurement of the slider pitch and roll natural frequencies.

The LDV 92 (FIG. 6) is used to measure the slider response and obtain values of $F_p$ and $F_r$ for the HSA being adjusted. FIG. 8 shows reference points 0 to 8 on the ABS of a slider where the LDV laser spot is to be directed. The following is one method to arrive at $F_p$ and $F_r$.

a) Put the laser spot on the center (location 0) of the slider ABS, and measure a reference response $z0(t)$.
b) Put the laser spot on points 1 through 8, and measure the response $zi(t)$, ($i=1, \ldots 8$).
c) Do a Fourier transform of $z0(t)$ and $zi(t)$ to obtain amplitudes of the Fourier transforms $Z0(f)$ and $Zi(f)$.

For only two responses:

$Zp(f)=Zi(f)-Z0(f)$, ($i=2$ or 7) for motion about the pitch or Y axis; and $Zr(f)=Zi(f)-Z0(f)$, ($i=4$ or 5) for motion about the roll or X axis.

Find the maximum peak in $Zp(f)$ in a specified frequency range (typically the range is between 1500 and 3500 Hz) and its corresponding frequency is $F_p$.

Find the maximum peak in $Zr(f)$ in the specified frequency range and its corresponding frequency is $F_r$.

For more than two responses:

Measure more than two responses to obtain more reliable results by averaging.

For example:

$Zp(f)=(Z2(f)+Z7(f))/2-Z0(f)$ and its corresponding frequency is $F_p$.

$Zr(f)=(Z4(f)+Z5(f))/2-Z0(f)$ and its corresponding frequency is $F_r$.

Step 4: Calculate Required PSA and RSA Shifts

The desired pitch and roll static torques are $PST_z$ and $RST_z$, respectively. They are determined based on the disk drive design requirements to achieve the desired flying height and flying dynamics for the particular slider design. The adjustments or shifts in PSA and RSA required to achieve $PST_z$ and $RST_z$, respectively, are calculated from the measured pitch and roll static attitude components and the determined pitch and roll torsional stiffnesses. The shifts in PSA and RSA (dP, dR) to achieve the specified $PST_z$ and $RST_z$ are calculated from the following equations:

$$dP = \frac{PST_z}{4\pi^2 F_p^2 I_p} - PSA_i$$

$$dR = \frac{RST_z}{4\pi^2 F_r^2 I_r} - RSA_i$$

Referring to step 5 of the flow chart of FIG. 7, if the dP and dR are smaller than a specified number (eP and eR, respectively), the process ends. If dP or dR is greater than eP or eR, respectively, then at step 6, the PSA and/or RSA are adjusted, after which steps 2 through 4 are repeated. After the process ends, if the measured PSA and RSA are also in the specified range, the HSA is acceptable. If either the PSA or RSA has been moved out of the specified range in order to achieve $PST_z$ or $RST_z$, respectively, the HSA is rejected.

The expression $4\pi^2 F_p^2 I_p$ is the pitch torsional stiffness $K_p$ of the HSA being adjusted, so the above steps of determining $I_p$ (step 1) and measuring $F_p$ (step 3) can be considered together as determining the pitch torsional $K_p$ stiffness of the HSA being adjusted. Similarly, the above steps of determining $I_r$ (step 1) and measuring $F_r$ (step 3) can be considered together as determining the roll torsional stiffness Kr of the HSA being adjusted.

Referring again to FIG. 6, the controller 60 uses the dP and dR values calculated in step 4 to determine the amount of laser energy to be applied to the flexure. As is known in the art and described in the previously cited '239 patent, this is accomplished by using a "look up" table derived from empirical calibration data, such as the number and intensity of laser pulses, or the power and duration of the pulses, required to bring about various PSA and RSA changes on similar suspensions.

Figure 9:
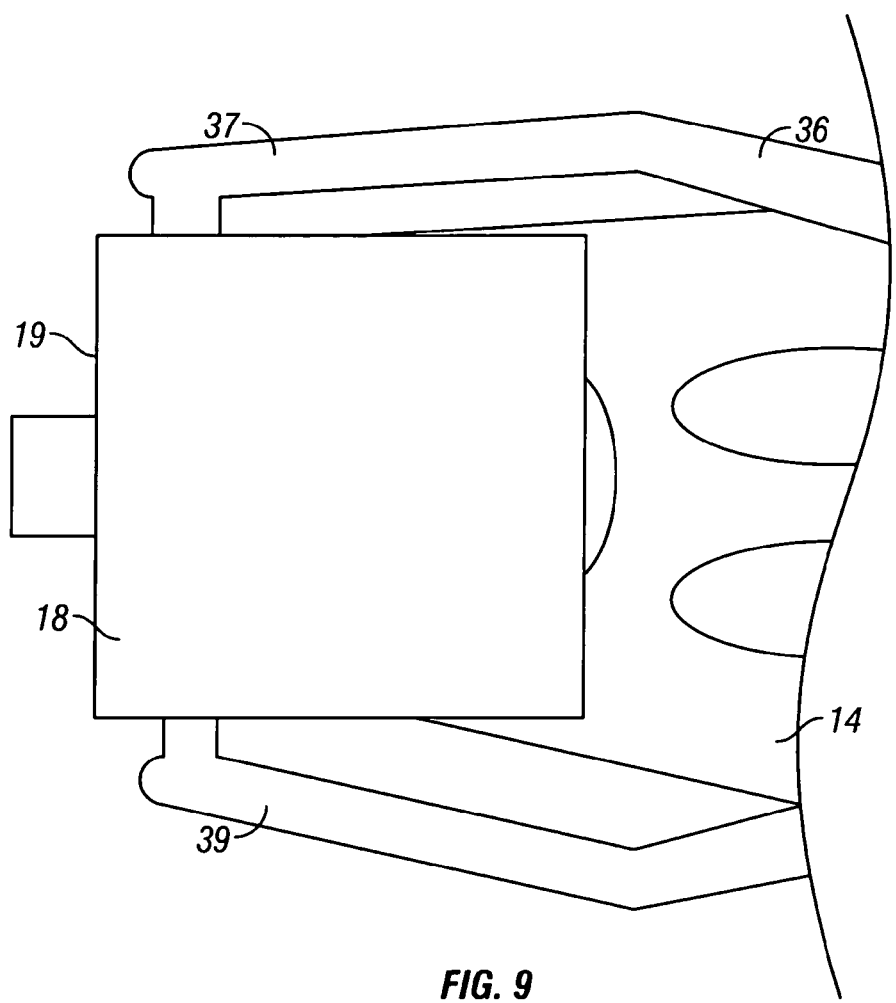
FIG. 9 is a view of a slider from the ABS showing a portion of the flexures where laser pulses are directed for adjusting the pitch and roll static attitudes.

FIG. 9 is a detailed view of slider 18 from the ABS side and shows portions of two legs 37, 39 of flexure 36. The load beam 14 is also shown in this view but the complete flexure 36 and the region where it attaches to the load beam 14 is not shown. The laser pulses are applied to the flexure legs 37, 39. Irradiation of just one leg will generally tend to change the RSA. Irradiation of both legs at single or multiple sites along the lengths of the legs bends the legs slightly in a manner that changes the PSA. Also, as is known in the art, the flexure can be bent mechanically to change the PSA and RSA.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for adjusting a static torque on a slider in a head-suspension assembly comprising:
    measuring a static attitude component of the slider;
    determining the attitude component torsional stiffness of the head-suspension assembly by determining the attitude component effective moment-of-inertia of the slider;
    calculating, from the measured static attitude component and the determined torsional stiffness, the adjustment of the static attitude component required to achieve the desired static torque; and
    adjusting the static attitude component.

2. The method of claim 1 wherein determining the moment-of-inertia comprises calculating the moment-of-inertia from the known geometry and material composition of the head-suspension assembly.

3. The method of claim 2 wherein determining the moment-of-inertia comprises measuring the attitude component natural frequency of the slider in each of a plurality of samples of head-suspension assemblies, and measuring the attitude component torsional stiffness of each of said samples.

4. The method of claim 1 wherein determining the attitude component torsional stiffness comprises measuring the attitude component natural frequency of the slider.

5. The method of claim 4 wherein measuring the attitude component natural frequency comprises vibrating the slider and measuring the vibration with a laser Doppler vibrometer.

6. The method of claim 5 wherein vibrating the head-suspension assembly comprises directing air flow to the slider.

7. The method of claim 1 wherein adjusting the static attitude component comprises heating the suspension with a laser.

8. The method of claim 7 wherein the suspension includes a load beam and a flexure connecting the slider to the load beam, and wherein heating the suspension with a laser comprises laser-irradiating the flexure.

9. The method of claim 1 wherein adjusting the static attitude component comprises bending the suspension.

10. The method of claim 9 wherein the suspension includes a load beam and a flexure connecting the slider to the load beam, and wherein bending the suspension comprises bending the flexure.

11. The method of claim 1 wherein calculating the static attitude component adjustment includes calculating the static torque and comparing said calculated static torque to the desired static torque.

12. The method of claim 1 wherein the attitude component is the slider pitch attitude.

13. The method of claim 1 wherein the attitude component is the slider roll attitude.

14. A method for adjusting the pitch static torque on a slider in a head-suspension assembly that includes a load beam, an air-bearing slider supporting a read/write head, and a flexure connecting the slider to the load beam and permitting the slider to pitch about a pitch axis and roll about a roll axis, the method comprising:
    measuring the pitch static attitude of the slider;
    determining the pitch torsional stiffness of the head-suspension assembly by determining the effective moment-of-inertia of the slider about the pitch axis and measuring the pitch natural frequency of the slider;
    calculating, from the measured pitch static attitude and the determined pitch torsional stiffness, the adjustment of the pitch static attitude required to achieve the desired pitch static torque; and
    adjusting the pitch static attitude.

15. The method of claim 14 wherein determining the pitch moment-of-inertia comprises calculating the pitch moment-of-inertia from the known geometry and material composition of the head-suspension assembly.

16. The method of claim 14 wherein determining the pitch moment-of-inertia comprises measuring the pitch natural frequency of the slider in each of a plurality of samples of head-suspension assemblies, and measuring the pitch torsional stiffness of the slider in each of said samples.

17. The method of claim 14 wherein measuring the pitch natural frequency comprises vibrating the slider and measuring the vibration with a laser Doppler vibrometer.

18. The method of claim 17 wherein vibrating the slider comprises directing air flow to the slider.

19. The method of claim 14 wherein adjusting the pitch static attitude comprises heating the flexure with a laser.

20. The method of claim 14 wherein adjusting the pitch static attitude comprises bending the flexure.

21. The method of claim 14 wherein calculating the pitch static attitude adjustment comprises dividing the desired pitch static torque by the determined pitch torsional stiffness and comparing said result to the measured pitch static attitude.

22. A method for adjusting the roll static torque on a slider in a head-suspension assembly that includes a load beam, an air-bearing slider supporting a read/write head, and a flexure connecting the slider to the load beam and permitting the slider to pitch about a pitch axis and roll about a roll axis, the method comprising:
    measuring the roll static attitude of the slider;
    determining the roll torsional stiffness of the head-suspension assembly by determining the effective moment-of-inertia of the slider about the roll axis and measuring the roll natural frequency of the slider;
    calculating, from the measured roll static attitude and the determined roll torsional stiffness, the adjustment of the roll static attitude required to achieve the desired roll static torque; and
    adjusting the roll static attitude.

23. The method of claim 22 wherein determining the roll moment-of-inertia comprises calculating the roll moment-of-inertia from the known geometry and material composition of the head-suspension assembly.

24. The method of claim 22 wherein determining the roll moment-of-inertia comprises measuring the roll natural frequency of the slider in each of a plurality of samples of head-suspension assemblies, and measuring the roll torsional stiffness of the slider in each of said samples.

25. The method of claim 22 wherein measuring the roll natural frequency comprises vibrating the slider and measuring the vibration with a laser Doppler vibrometer.

26. The method of claim 18 wherein vibrating the slider comprises directing air flow to the slider.

27. The method of claim 23 wherein adjusting the roll static attitude comprises heating the flexure with a laser.

28. The method of claim 23 wherein adjusting the roll static attitude comprises bending the flexure.

29. The method of claim 23 wherein calculating the roll static attitude adjustment comprises dividing the desired roll static torque by the determined roll torsional stiffness and comparing said result to the measured roll static attitude.

* * * * *

UNITED STATES PATENT AND TRADEMARK OFFICE
CERTIFICATE OF CORRECTION

| | |
|---|---|
| PATENT NO. | : 7,069,156 B2 |
| APPLICATION NO. | : 10/763582 |
| DATED | : June 27, 2006 |
| INVENTOR(S) | : Quighua Zeng |

It is certified that error appears in the above-identified patent and that said Letters Patent is hereby corrected as shown below:

In Claim 26, (column 10, line 16) delete the numeral "18" and replace with the numeral "25".

Signed and Sealed this

Twenty-ninth Day of August, 2006

JON W. DUDAS
*Director of the United States Patent and Trademark Office*